(12) United States Patent
Stenneth et al.

(10) Patent No.: US 12,442,660 B2
(45) Date of Patent: Oct. 14, 2025

(54) AUTOMATED ROAD INCIDENT DETECTION USING VEHICLE SENSOR DATA

(71) Applicant: Microsoft Technology Licensing, LLC, Redmond, WA (US)

(72) Inventors: Leon Oliver Stenneth, Chicago, IL (US); Catalin Bogdan Capota, Palatine, IL (US); Elena-Roxana Fuiorea, Timis (RO); Alexandru Cristian, Timis (RO); Roxana-Maria Iliese, Jud. Suceava (RO)

(73) Assignee: Microsoft Technology Licensing, LLC, Redmond, WA (US)

( * ) Notice: Subject to any disclaimer, the term of this patent is extended or adjusted under 35 U.S.C. 154(b) by 181 days.

(21) Appl. No.: 18/217,905

(22) Filed: Jul. 3, 2023

(65) Prior Publication Data

US 2024/0142264 A1 May 2, 2024

(30) Foreign Application Priority Data

Oct. 31, 2022 (RO) .................................. 202200698

(51) Int. Cl.
*G01C 21/00* (2006.01)
*G08G 1/01* (2006.01)
*G08G 1/052* (2006.01)

(52) U.S. Cl.
CPC ...... *G01C 21/3841* (2020.08); *G01C 21/3811* (2020.08); *G08G 1/0112* (2013.01); *G08G 1/052* (2013.01)

(58) Field of Classification Search
CPC ............ G01C 21/3841; G01C 21/3811; G08G 1/0112; G08G 1/052
See application file for complete search history.

(56) References Cited

U.S. PATENT DOCUMENTS

| | | |
|---|---|---|
| 10,311,728 B2 | 6/2019 | Stenneth et al. |
| 10,417,509 B2 | 9/2019 | Fowe et al. |
| 11,049,390 B2 | 6/2021 | Mubarek |
| 2019/0051172 A1* | 2/2019 | Stenneth ................ G08G 1/163 |
| 2022/0180741 A1 | 6/2022 | Fowe |
| 2022/0207993 A1 | 6/2022 | Fowe |
| 2022/0207994 A1 | 6/2022 | Xu et al. |
| 2023/0080319 A1* | 3/2023 | Zhang ................ G01C 21/3807 701/26 |

FOREIGN PATENT DOCUMENTS

| | | |
|---|---|---|
| CN | 102779420 B | 4/2014 |
| CN | 103730013 B | 5/2016 |
| JP | 3876653 B2 | 11/2006 |

* cited by examiner

*Primary Examiner* — Adnan M Mirza
(74) *Attorney, Agent, or Firm* — Ray Quinney & Nebeker P.C.; Tiffany B. Healy

(57) ABSTRACT

The present disclosure relates to methods and systems for automated road incident detection using vehicle sensor data to detect road incidents in real time. The vehicle sensor data is provided from sensors on vehicles on the road segment. The methods and systems update a map with the detected road incidents in real time of detecting the road incident, resulting in updated maps with the road incident information and updated traffic flow information on the maps.

19 Claims, 11 Drawing Sheets

AUTOMATED ROAD INCIDENT DETECTION USING VEHICLE SENSOR DATA

CROSS REFERENCE TO RELATED APPLICATIONS

This application claims benefit and priority to Romanian Application No. 202200698 filed Oct. 31, 2022, which is incorporated herein by reference in its entirety.

BACKGROUND

Approaches to detect road incidents on a road network typically depend on users to input information as they drive along the road network. Maps are typically updated with the road incidents reported by the users. However, user input is error prone and may lead to erroneous maps or erroneous information provided on the maps. Approaches to detect road incidents also rely on traffic operators to report the road incidents and the maps are typically updated with the road incidents reported by the officers. However, there is typically a delay in time before the traffic operators arrive at the incident location, resulting in a delay in updating the maps until the traffic operators arrive at the incident location.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes obtaining, by a traffic estimation component executing on a computing device, vehicle sensor data from a plurality of vehicles on a road network. The method includes receiving a road segment from the road network. The method includes matching, using a map matching process, the vehicle sensor data to the road segment. The method includes using the vehicle sensor data for detecting a road incident on the road segment in response to a confidence for the vehicle sensor data exceeding a threshold. The method includes using an alternate source of vehicle data for detecting the road incident on the road segment in response to the confidence for the vehicle sensor data being below the threshold.

Some implementations relate to a device. The device includes a processor; memory in electronic communication with the processor; and instructions stored in the memory, the instructions being executable by the processor to: obtain vehicle sensor data from a plurality of vehicles on a road network; receive a road segment from the road network; match, using a map matching process, the vehicle sensor data to the road segment; use the vehicle sensor data for detecting a road incident on the road segment in response to a confidence for the vehicle sensor data exceeding a threshold; and use an alternate source of vehicle data for detecting the road incident on the road segment in response to the confidence for the vehicle sensor data being below the threshold.

Some implementations relate to a method. The method includes receiving vehicle sensor data with speed data from a plurality of vehicles on a road segment. The method includes determining, at a time period, a confidence of the speed data for the road segment. The method includes using the speed data to automatically update a traffic flow on a map of the road segment in response to the confidence of the speed data being equal to a threshold or exceeding the threshold. The method includes using an alternate source of the speed data for updating the traffic flow on the map of the road segment in response to the confidence for the speed data being below the threshold.

Some implementations relate to a device. The device includes a processor; memory in electronic communication with the processor; and instructions stored in the memory, the instructions being executable by the processor to: receive vehicle sensor data with speed data from a plurality of vehicles on a road segment; determine, at a time period, a confidence of the speed data for the road segment; use the speed data to automatically update a traffic flow on a map of the road segment in response to the confidence of the speed data being equal to a threshold or exceeding the threshold; and use an alternate source of the speed data for updating the traffic flow on the map of the road segment in response to the confidence for the speed data being below the threshold.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
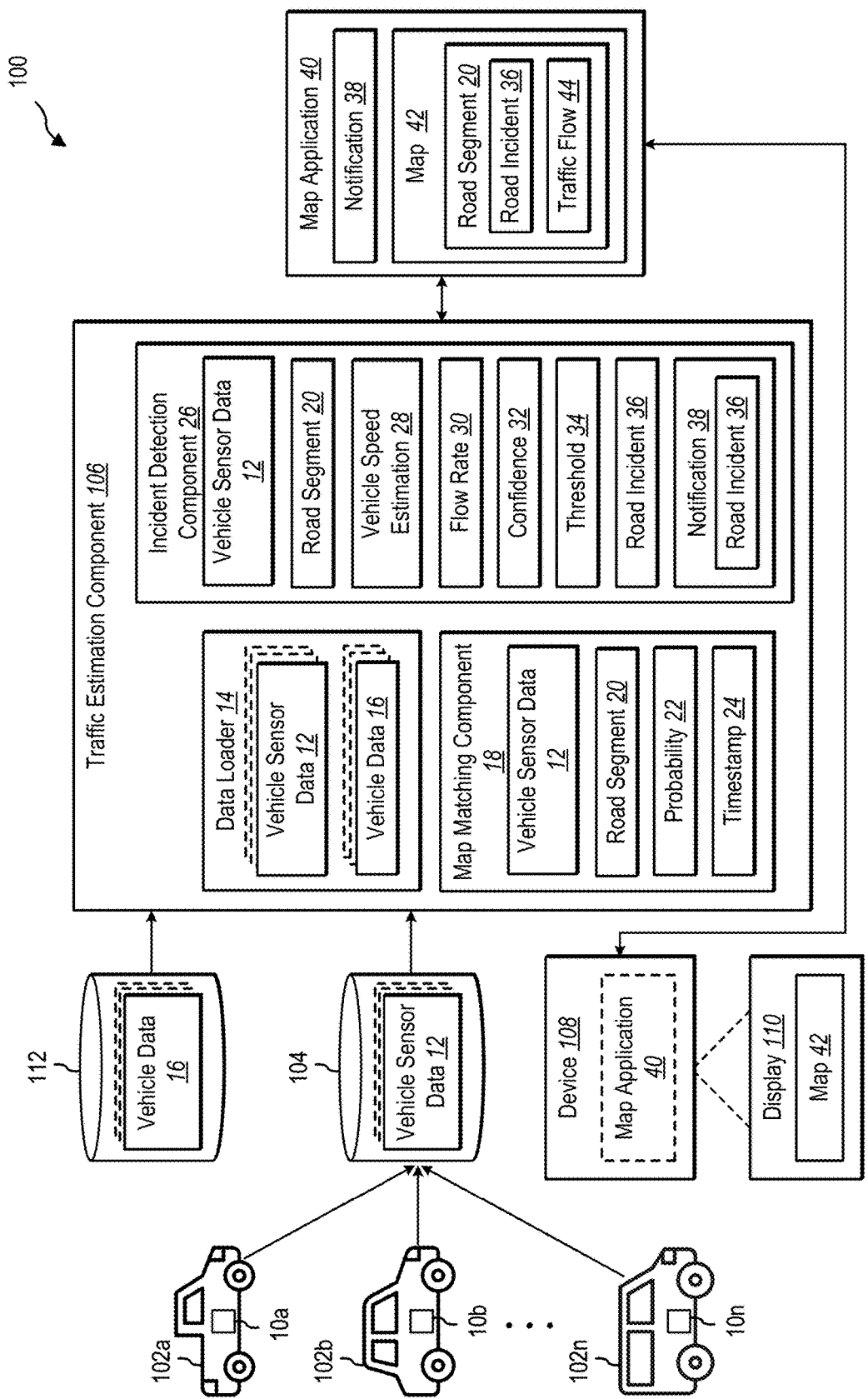
FIG. 1 illustrates an example environment for automated road incident detection in accordance with implementations of the present disclosure.

This disclosure generally relates to automated road incident detection. Road incident detection systems typically depend on users to input information as they drive to report road incidents along the road network. Maps of the road network are typically updated with the road incidents reported by the users. However, user input is error prone and may lead to erroneous maps and/or incidents detected on the maps. In addition, road incident detection system typically relies on traffic operators to report the incidents, which typically are delayed since the traffic operators must drive to the incident location before reporting the incidents.

The methods and systems of the present disclosure provide automated road incident detection using real time vehicle sensor data as input to detect road incidents in real time. The incidents being detected include traffic slowdowns or lane closures, such as, accidents, broken down vehicles, road work, or any other incidents that results in a bottleneck of vehicles the road networks (e.g., a lane closure or slowdown of the vehicles). The methods and systems update a map with the location, direction, and timestamp of the detected road incidents in real time of detecting the incident, resulting in updated maps with the incident information and updated traffic slowdowns that result in response to the incident. The methods and systems of the present disclosure automatically detect road incidents using vehicle sensor data and update maps with the detected road incident without user input.

In some implementations, a confidence is determined for the vehicle sensor data. The confidence is used in deciding whether to use the vehicle sensor data for the incident detection or use an alternate data source for the incident detection. The confidence estimate is based on the data freshness (more recent data results in higher confidence), the quality of the data providers, the number of vehicles reporting real time speeds, and the closeness of the speed values that are reported by the vehicles. The vehicle sensor data is used for the incident detection in response to the confidence being equal to a threshold or exceeding the threshold. An alternate data source is used for the incident detection in response to the confidence being below the threshold.

In some implementations, the systems and methods are directed towards a map level road incident detection system that receives two inputs: real-time vehicle sensor data that is map matched, and a road network geometry. The systems and methods automatically detect road incidents on the road network using the vehicle sensor data and the road network geometry.

In some implementations, the systems and methods are directed towards a vehicle speed estimation of a plurality of vehicles on a road segment based on the vehicle sensor data. A flow rate estimation of the plurality of vehicles on the road network is determined using the vehicle sensor data provided from sensors of the plurality of vehicles on the road segment. The vehicle sensor data provides speed data for the plurality of vehicles. A confidence estimate is determined for the vehicle sensor data and the confidence is used in deciding whether to use the vehicle sensor data for the flow rate estimation or to use an alternate data source for the flow rate estimation. The methods and systems update a traffic flow of a map of the road segment in real time using the flow rate estimation of the road segment, and thus, providing updated information for a speed of travel on the road segment.

One technical advantage of the systems and methods of the present disclosure is detecting road incidents in real time, and thus, increasing the coverage of road incidents that are included in a map of a region. Another technical advantage of the systems and methods of the present disclosure is automated road incident detection using vehicle sensor data. Another technical advantage of the systems and methods of the present disclosure is a precise computation of an expected time of arrival time, enabling relevant notification to users and providing updated maps to the users. Another technical advantage of the systems and method of the present disclosure is using the automated road incident detection to provide early warnings or notifications of the detected incidents.

Referring now to FIG. 1, illustrated is an example environment 100 for automated road incident detection. The environment 100 includes a plurality of vehicles 102 (e.g., 102a, 102b up to 102n (where n is a positive integer)) driving on a road network. Each vehicle 102 includes a sensor 10 (e.g., 10a, 10b, 10n) that provides vehicle sensor data 12. While a single sensor 10 is illustrated in each vehicle 102, a plurality of sensors 10 may be used in each vehicle 102 to generate the vehicle sensor data 12. For example, the sensors 10 include steering wheel sensors, brake sensors, a global positioning system (GPS), accelerometer, gyroscope, windshield wiper, door status sensor, seatbelt sensor, airbag sensors, and/or hazard light sensor. The vehicle sensor data 12 provides information about a location (latitude and longitude) of each vehicle 102, a speed of each vehicle 102, a timestamp 24, and/or a heading of the vehicle 102. For example, the vehicle sensor data 12 provides airbag deployment information in response to the airbag being triggered in the vehicle 102. Another example includes the vehicle sensor data 12 is provided by the GPS and the GPS data is sent from each vehicle 102a, 102b, 102n. Another example includes the vehicle sensor data 12 provides information that the hazard lights on the vehicle 102 are on.

The vehicle sensor data 12 is provided from the vehicles 102a, 102b, 102n in real time with a latency of seconds or milliseconds. The environment 100 enables the secure handling of the user's 104 information. The vehicle sensor data 12 is provided from the vehicles 102 in a privacy-aware manner where the user's 104 information is obfuscated. In some implementations, the user 104 may opt-in or opt-out of the vehicle sensor data 12 being sent from the vehicle 102.

In some implementations, the vehicle sensor data 12 is provided to a datastore 104 that stores the vehicle sensor data 12 provided from each vehicle 102a, 102b, 102n. A traffic estimation component 106 obtains the vehicle sensor data 12 from the datastore 104. The traffic estimation component 106 uses the vehicle sensor traces provided in the vehicle sensor data 12 to detect areas in the road network that contain bottlenecks (e.g., a reduction in vehicle speed or vehicles stopping). In some implementations, the vehicle sensor data 12 is provided to the traffic estimation component 106 directly from each vehicle 102a, 102b, 102n.

A data loader 14 obtains the vehicle sensor data 12. In some implementations, the data loader 14 obtains the vehicle sensor data 12 at every time period. The time period is a configurable amount of time that the data loader 14 obtains the vehicle sensor data 12. For example, the time period is two minutes and at each two-minute interval, the data loader 14 obtains the vehicle sensor data 12. Another example includes the time period is five minutes and at each five-minute interval, the data loader obtains the vehicle sensor data 12. The amount of the vehicle sensor data 12 that the data loader 14 obtains varies. For example, the amount of vehicle sensor data 12 is obtained for a past five minutes. Thus, at the designated time period interval (e.g., every five minutes), the data loader 14 obtains the past five minutes of vehicle sensor data 12.

In some implementations, a plurality of datastores 104 provide the vehicle sensor data 12 to the data loader 14. The datastores 104 may correspond to different content providers that obtain the vehicle sensor data 12 from different models of cars. For example, a first datastore 104 corresponds to a first content provider that obtains vehicle sensor data 12 from a first car model. The second datastore 104 corresponds to a second content provider that obtains vehicle sensor data 12 from a second car model and a third car model. The third datastore 104 corresponds to a third content provider that obtains vehicle sensor data 12 from commercial vehicles. As such, the data loader 14 may obtain the vehicle sensor data 12 from a variety of content providers and/or different car models.

In some implementations, the data loader 14 obtains vehicle data 16 from an alternate source than the vehicle sensor data 12. The vehicle data 16 may include any data that is obtained using other sources than the vehicles 102. The vehicle data 16 may include estimates of speed of the vehicle 102 or estimates of direction of travel of the vehicle 102. In some implementations, the alternate source is a third party with different vehicle fleets than the vehicles 102. The vehicle data 16 may be obtained from a datastore 112 separate from the datastore 104. In some implementations, the alternate source is street cameras.

A map matching component 18 aligns the vehicle sensor data 12 with the road network. The map matching component 18 may identify a road segment 20 in the road network for matching to the vehicle sensor data 12. The map matching component 18 uses the location information in the vehicle sensor data 12 to identify a road segment 20 nearby the location of the vehicle sensor data 12. For example, the map matching component 18 selects the road segment 20 from a set of road segments based on a distance and heading alignment of the vehicle 102 (i.e., GPS sensor data) and road geometries. In some implementations, a minimum length is set for the road segment 20. For example, the minimum length is 300 meters. In some implementations, the map matching component 18 obtains the road segment 20 from a map datastore.

The road segment 20 includes different road segment information that the map matching component 18 uses in aligning the vehicle sensor data 12 to the road segment 20. For example, the road segment information includes a segment start identified by latitude and longitude coordinates. Another example of the road segment information includes a segment end identified by latitude and longitude coordinates. Another example of the road segment information includes one or more shape points that define a shape of the road segment 20 at different latitude and longitude segments.

In some implementations, the map matching component 18 uses a map matcher (point or path based) that uses the road segment information to map the vehicle sensor data 12 to different points on the road segment 20. The map matching component 18 outputs a probability 22 the vehicle 102 is at the different points on the road segment 20. The map matching component 18 also outputs an offset from the segment start at the different points on the road segment 20 and the timestamp 24 for the vehicle 102 at the different points along the road segment 20. In some implementations, the vehicle sensor data 12 is mapped to the road segment 20 once by the map matching component 18 and the probability 22 and the timestamp 24 is used for both traffic estimation (e.g., a speed of traffic on the road segment 20 and road incident detection on the road segment 20).

An incident detection component 26 uses the probability 22 that the vehicle 102 is on the road segment 20 and the timestamps 24 for the vehicle 102 on the road segment 20 in determining a vehicle speed estimation 28 of each vehicle 102 on the road segment 20. The incident detection component 26 divides the road segment 20 into a plurality of subsegments of equal length. The subsegment length is a configurable parameter. One example of the subsegment length is 100 meters. In some implementations, the incident detection component 26 divides the road segment 20 into the subsegments in real time. In some implementations, the road segments 20 are divided into subsegments offline and the incident detection component 26 obtains the subsegments from a map datastore in real time.

The vehicle speed estimation 28 includes a travel time difference that compares a difference in the travel time between adjacent road subsegments. The incident detection component 26 uses the timestamps 24 for the vehicle 102 on the subsegments of the road segment 20 in determining the travel time difference of each vehicle 102 on the road segment 20. If a bottleneck (e.g., a reduction in speed) is present on the road segment 20 at the upstream subsegment of the adjacent subsegment, the travel time is greater than the downstream subsegment of the adjacent subsegment. The upstream subsegment is the portion of the road segment 20 before the bottleneck (e.g., the reduction in speed) and the downstream subsegment is the portion of the road segment 20 after the bottleneck. In addition, the vehicle speed estimation 28 includes a ratio of the travel time difference between the adjacent subsegments.

The vehicle speed estimation 28 of each vehicle 102 on the road segment 20 is used to determine a flow rate 30 of the plurality of vehicles 102 on the road segment 20. The flow rate 30 identifies a number of the vehicles 102 on the road segment 20 during a time period. For example, the time period is five minutes and the flow rate 30 is determined for the road segment 20 every five minutes. Another example includes a time period of ten minutes and the flow rate 30 is determined for the road segment 20 every ten minutes. The incident detection component 26 uses the vehicle speed estimation 28 for each vehicle 102 on the road segment 20 during the time period to determine the flow rate 30 for the road segment 20.

In some implementations, a confidence 32 is determined for the vehicle speed estimation 28 of the vehicle 102 generated from the vehicle sensor data 12. The confidence 32 is a measure that identifies a level of trust in the vehicle speed estimation 28. The confidence 32 takes the vehicle speed estimation 28 as input and outputs a real number between zero and one that identifies a level of trust in the vehicle speed estimation 28. Values closer to zero have a lower level of trust in the vehicle speed estimation 28 and values closer to one have a higher level of trust in the vehicle speed estimation 28.

In some implementations, the data freshness (e.g., more recent data results in higher confidence) is used in determining the confidence 32 of the vehicle speed estimation 28. In some implementations, a quality of the data providers is used in determining the confidence 32. For example, a quality score of a sensor data provider is provided for the vehicle sensor data. In some implementations, a number of vehicles 102 reporting real time speeds is used in determining the confidence 32. In some implementations, a closeness of the speed values that are reported by the vehicles 102 is used in determining the confidence 32. In some implementations, any combination of the data freshness, quality of the data providers, a number of vehicles reporting real time speeds, and/or a closeness of the speed values is used in determining the confidence 32. Different weights may be applied to the different factors (e.g., a first weight is applied to the data freshness, a second weight is applied to the quality of the data providers, a third weight is applied to a number of vehicles reporting real time speeds, and a fourth weight is applied to the quality of the data providers). As such, the value output as the confidence 32 is calculated based on the different weights applied to the different factors.

The incident detection component 26 uses the confidence 32 in determining whether to use the vehicle speed estimation 28 generated using the vehicle sensor data 12 in determining the traffic estimation (e.g., the flow rate 30) for the road segment 20 or to use the vehicle data 16 obtained from an alternate source different from the vehicle sensor data 12 obtained from the vehicles 102 in determining the traffic estimation. For example, the alternate source may provide the vehicle data 16 with an estimation of the traffic flow on the road segment 20 from a traffic camera on the road segment 20. Another example includes the alternate source is a third party that provides the vehicle data 16 with an estimation of the traffic flow on the road segment 20 from vehicles other than the vehicles 102. Another example includes the alternate source provides the vehicle data 16 with speed data for the road segment 20.

The incident detection component 26 compares the confidence 32 of the vehicle speed estimation 28 generated based on the vehicle sensor data 12 to a threshold 34 and uses the vehicle speed estimation 28 in determining the flow rate 30 in response to the vehicle speed estimation 28 being equal to, or exceeding, the threshold 34 (e.g., a high level of trust exists in the vehicle speed estimation 28). However, if the vehicle sensor data 12 is below the threshold 34 (e.g., a lower level of trust exists in the vehicle speed estimation 28), the incident detection component 26 uses the vehicle data 16 provided by the alternate source in determining the flow rate 30. One example of the threshold 34 is 90% and if the confidence is 92% for the vehicle speed estimation 28, the incident detection component 26 uses the vehicle speed estimation 28 based on the vehicle sensor data 12 in determining the flow rate 30. However, if the confidence is 87%, the incident detection component 26 uses the vehicle data 16 or speed data provided by an alternate source in determining the flow rate 30.

In some implementations, the threshold 34 is a confidence level associated with the vehicle data 16 provided by the alternate source. As such, the incident detection component 26 uses the vehicle speed estimation 28 generated using the vehicle sensor data 12 in response to the confidence 32 exceeding a confidence level of the vehicle data 16 provided by the alternate source.

The incident detection component 26 uses a difference in the flow rate 30 between two consecutive time periods in identifying and/or confirming a road incident 36 on the road segment 20. The incident detection component 26 uses a change in the flow rate 30 between two time periods in identifying the road incident 36 at the subsegment where the travel time decreases or identifying that the road incident 36 is no longer present on the road subsegment where the travel time is constant or returns back to normal. As such, the incident detection component 26 uses three thresholds (the travel time difference between consecutive subsections of the road segment, the travel time difference ratio between consecutive subsections of the road segment, and the flow rate ratio difference over consecutive time periods) in automatically detecting the road incident 36 on the road segment 20 using the vehicle sensor data 12.

One example use case includes a time period of five minutes. The incident detection component 26 identifies a reduction in travel time for the vehicles 102 between two subsegments on the road segment 20 at 10:08 am. The incident detection component 26 compares the flow rate 30 on the road segment 20 at 10:05 am to the flow rate 30 on the road segment at 10:10. If a change in the flow rate 30 of the road segment 20 occurs between 10:05 am and 10:10 am, the incident detection component 26 uses the change in the flow rate 30 and the reduction in travel time of the vehicles 102 to detect that a road incident 36 occurred on the road segment 20.

The incident detection component 26 generates a notification 38 with the road incident 36 and road incident information. The road incident information includes a location (latitude and longitude coordinates) of the road subsegment where the road incident 36 is detected, a direction of travel for the road incident 36, a timestamp 24 for the road incident 36, and the flow rate 30 for the road segment 20 where the road incident 36 is detected. The notification 38 is also generated to indicate that the road incident 36 is clear and no longer present on the road subsegment 20. The road incident information includes the location of the road subsegment where the road incident 36 is no longer detected, the timestamp 24, and the flow rate 30 for the road segment 20.

In some implementations, a map application 40 receives the notification 38 with the road incident 36 and the road incident information (e.g., the location of the road incident 36, the flow rate 30, and the timestamp 24, and the incident category). The map application 40 updates a map 42 of the road segment 20 with the detected road incident 36. In some implementations, the map application 40 adds an icon to the map 42 at the road incident 36 location. The icon is indicative of the category of the road incident 36 that was detected. For example, the icon indicates that the category of the road incident 36 is construction. Another example includes the icon indicates that the category of the road incident 36 is road closure. Another example includes the icon indicates that the category of the road incident 36 is accident.

In some implementations, the map application 40 updates a traffic flow 44 display on the map based on the flow rate 30 of the road segment 20. For example, the map application 40 displays a color for the traffic flow 44 that indicates a speed of travel for a road segment 20. The map application 40 changes a color of the traffic flow 44 displayed to indicated that the flow rate 30 of the road segment 20 has changed. For example, the map application 40 changes the traffic flow 44 displayed from a green color that indicated vehicles 102 moving close to a posted speed for the road segment 20 to a red color that indicates a reduction in speed of the vehicles, or the vehicles are stopped on the road segment 20 in response to receiving the notification 38 that the road incident 36 is detected. Another example includes the map application 40 changing a color of the traffic flow 44 displayed from an orange color indicating a reduction in speed of the vehicles 102 on the road segment 20 to a green color indicating that the vehicles 102 are moving close to a posted speed for the road segment 20 in response to receiving the notification 38 that the road incident 36 has cleared.

The map application 40 updates the map 42 of the road segment 20 based on the road incident 36 automatically detected using the vehicle sensor data 12 of the vehicles 102 on the road segment 20, enabling relevant notifications and/or warnings to users (e.g., the drivers of the vehicles 102 on the road segment 20) through updated maps 42.

In some implementations, the map 42 is displayed on a display 110 of one or more devices 108. The devices 108 are used to access the map application 40. In some implementations, the map application 40 is local to the device 108. In some implementations, the map application 40 is remote from the device 108. In some implementations, the devices 108 are in the plurality of vehicles 102 on the road segment 20 and the map 42 provides the detected road incident 36 and the change in the traffic flow 44 to users (e.g., drivers or passengers) of the plurality of vehicles 102. The change in the traffic flow 44 may be used to revise estimated arrival times at a destination provided to a user of the vehicle 102, resulting in a precise computation of an expected time of arrival time. In some implementations, the map 42 is displayed on the display 110 of the device 108 of a user remote from the road segment 20 performing a search of the road segment 20 using the map application 40 and the user receives the current traffic flow 44 conditions displayed on the map 42.

In some implementations, one or more computing devices (e.g., servers and/or devices) are used to perform the processing of the environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the traffic estimation component 106, the map application 40, the datastore 104, the datastore 112, are implemented wholly on the same computing device. Another example includes one or more subcomponents of the traffic estimation component 106 (the data loader 14, the map matching component 18, the incident detection component 26), the map application 40, the datastore 104, and/or the datastore 112 are implemented across multiple computing devices. Moreover, in some implementations, one or more subcomponent of the traffic estimation component 106 (the data loader 14, the map matching component 18, the incident detection component 26), the map application 40, the datastore 104, and/or the datastore 112 may be implemented are processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

The environment 100 provides automated detection of road incidents 36 by using the vehicle sensor data 12 to identify the road incidents 36 and updating a map 42 with the detected road incidents 36 in response to detecting the road incidents 36. By using the vehicle sensor data 12 to detect the road incidents 36, the environment 100 detects the road incidents 36 in real time, increasing the coverage of the road incidents 36 that are included in the map 42 of a region. Moreover, by using the vehicle sensor data 12 to automatically detect the road incidents 36, the environment 100 provides earlier notifications 38 with warnings of the detected road incidents 36 by providing updated maps 42 in real time of detecting the road incidents 36 with the updated traffic slowdowns on the road segment 20 that result in response to the road incident 36.

Figure 2:
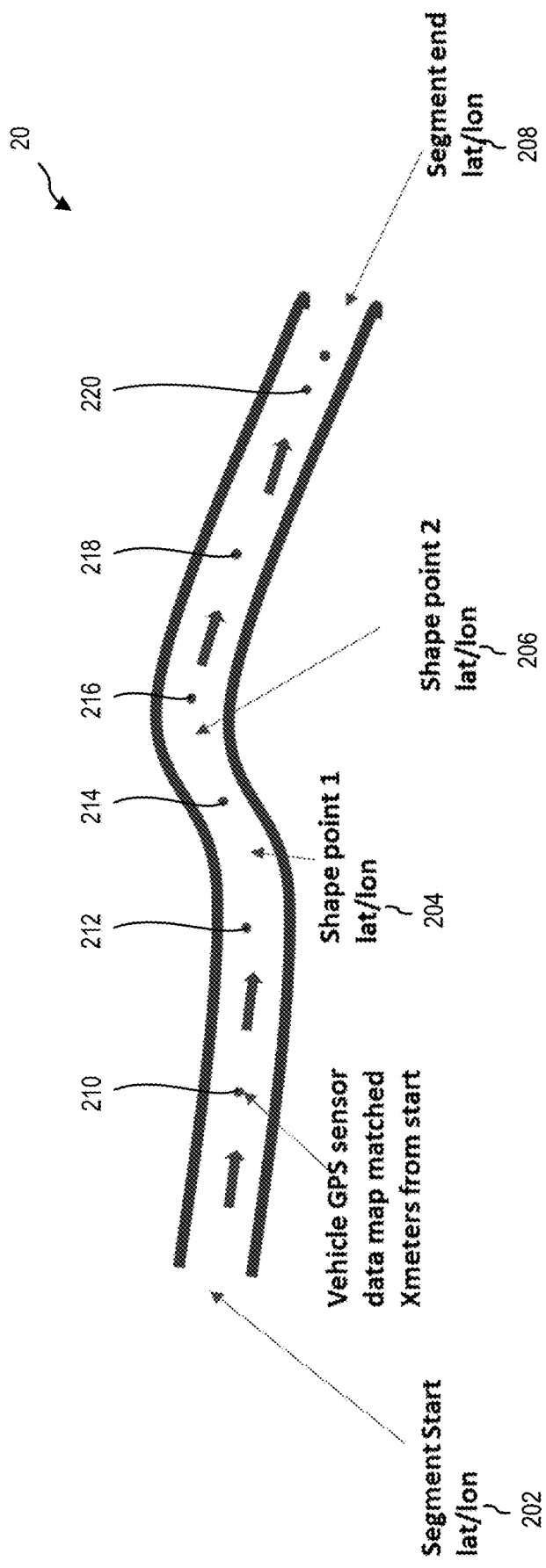
FIG. 2 illustrates an example of a road segment with the vehicle sensor data map matched to the road segment in accordance with implementations of the present disclosure.

Referring now to FIG. 2, illustrated is an example road segment 20 with the vehicle sensor data 12 map matched to the road segment 20 by the point map matching component 18 (FIG. 1). The road segment 20 includes a segment start 202 with the latitude and longitude coordinates of the segment start 202 of the road segment 20. The road segment 20 also includes shape points 204, 206 (a first shape point 1 and a second shape point 2) with the latitude and longitude coordinates of the shape points 204, 206. The shape points indicate a shape of the road segment 20 at the latitude and longitude coordinates of the shape points 204, 206. The road segment 20 also includes a segment end 208 with the latitude and longitude coordinates of the segment end 208.

The map matching component 18 uses point-based map matching to match the vehicle sensor data 12 to the road segment 20. At point 210, the map matching component 18 matches the vehicle sensor data 12 to the road segment at a first distance from the segment start 202. At point 212, the map matching component 18 matches the vehicle sensor data 12 to the road segment a second distance from the segment start 202. The second distance is greater than the first distance from the segment start 202. At point 214, the map matching component 18 matches the vehicle sensor data 12 to the road segment at a third distance from the segment start 202. The third distance is greater than the first and second distances from the segment start 202. At point 216, the map matching component 18 matches the vehicle sensor data 12 to the road segment at a fourth distance from the segment start 202. The fourth distance is greater than the first, second, and third distance from the segment start 202. At point 218, the map matching component 18 matches the vehicle sensor data 12 to the road segment at a fifth distance from the segment start 202. The fifth distance is greater than the first, second, third, and fourth distances from the segment start 202. At point 220, the map matching component 18 matches the vehicle sensor data 12 to the road segment at sixth distance from the segment start 202. The sixth distance is greater than the first, second, third, fourth, and fifth distances from the segment start 202.

The map matched vehicle sensor data 12 includes an offset along the road segment 20 and the timestamp 24 (FIG. 1) at each point (e.g., the point 210, the point 212, the point 214, the point 216, the point 218, the point 220) in the road segment 20 the vehicle sensor data 12 is mapped to the road segment 20.

The map matching component 18 outputs a probability 22 that the vehicle 102 is on the road segment 20 at the different points (e.g., the point 210, the point 212, the point 214, the point 216, the point 218, the point 220) and the offset (e.g., the first distance, the second distance, the third distance, the fourth distance, the fifth distance, and the sixth distance) from the segment start 202. For example, the vehicle sensor data 12 may be obtained from a low-quality sensor and may show the vehicle 102 on a neighboring road. Another example includes an urban canyon effect interfering with the vehicle sensor data 12 and the vehicle sensor data 12 may place the vehicle 102 on a shoulder of a road segment 20. As such, the probability 22 indicates a confidence level that the vehicle 102 is on the road segment 20 at the different points (e.g., the point 210, the point 212, the point 214, the point 216, the point 218, the point 220) at the timestamp 24.

Figure 3:
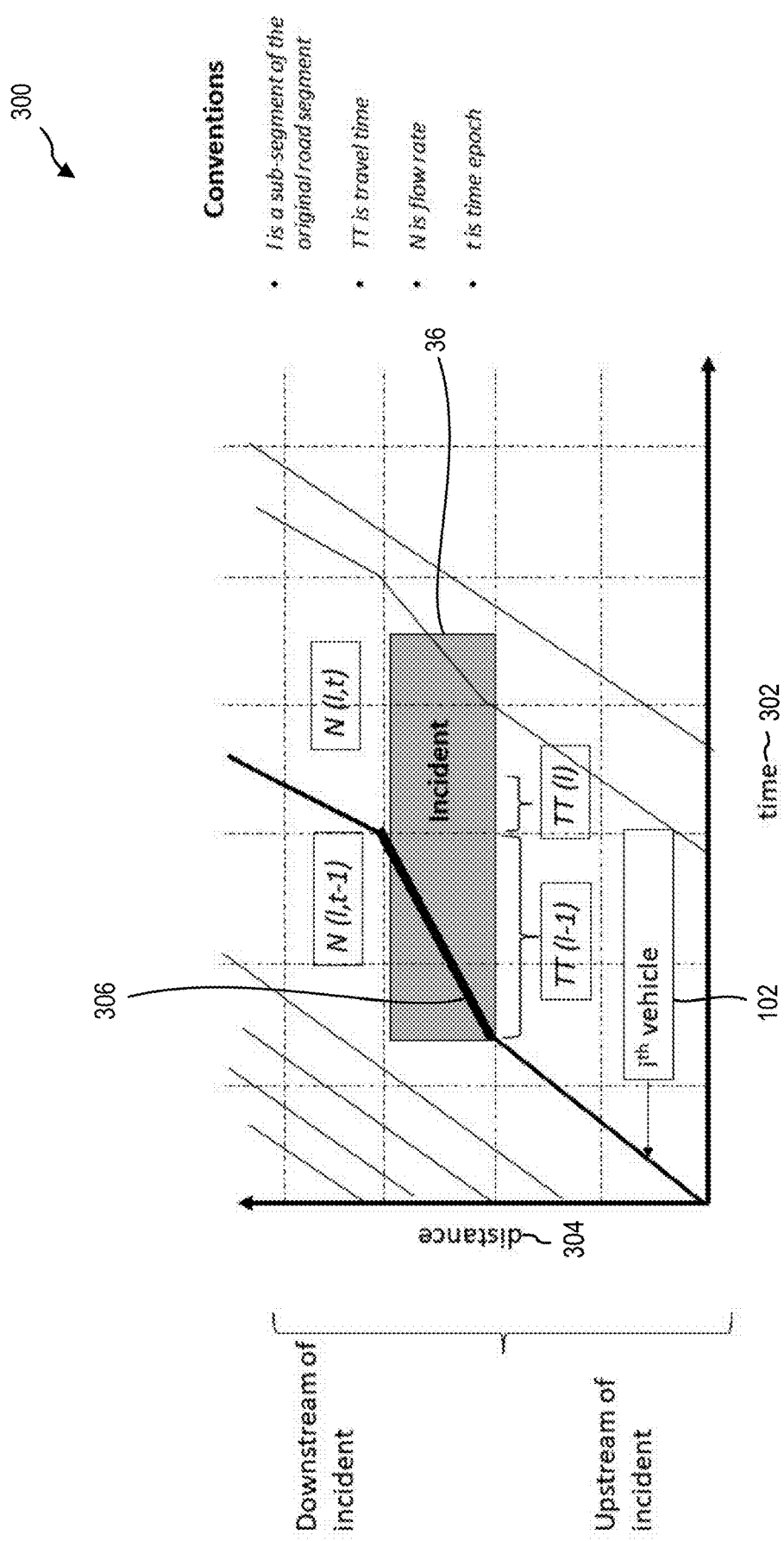
FIG. 3 illustrates an example graph for identifying a road incident in accordance with implementations of the present disclosure.

Referring now to FIG. 3, illustrated is an example graph 300 for identifying a road incident 36. The graph 300 includes an x-axis 302 illustrating time along a road segment 20 (FIG. 1) and a y-axis 304 illustrating a distance traveled by a vehicle 102 along the road segment 20. N is the flow rate 30 calculated by the incident detection component 26 and 1 is a subsegment of the original road segment 20 identified by the incident detection component 26. TT is the travel time of a vehicle 102 on the subsegment determined by the incident detection component 26 and t is the time epoch for calculating the flow rate 30 for the road segment 20 by the incident detection component 26.

The incident detection component 26 (FIG. 1) identifies the road incident 36 by comparing the upstream travel time of vehicles 102 between two adjacent subsegments of the road segment 20. If the travel time of the upstream subsegment is greater than the travel time of downstream subsegment, the incident detection component 26 identifies a bottleneck (a reduction in speed of the vehicles 102) at the upstream subsegment. The incident detection component 26 uses the vehicle sensor data 12 from the ith vehicle 102 to compute the travel time difference between the adjacent road subsegments. The incident detection component 26 also uses the vehicle sensor data 12 from the ith vehicle 102 to compute the travel time difference ratio between the adjacent subsegments.

The incident detection component 26 may further use the flow rate 30 of the road segment 20 in addition to the difference between the travel time of the vehicles 102 between the two subsections to identify the road incident 36 (e.g., a lane closure or accident) that is causing the bottleneck at the upstream subsegment. The incident detection component 26 uses the vehicle sensor data 12 to calculate a ratio of a flow rate 30 difference between two consecutive time epochs for the road segment 20. As such, the incident detection component 26 uses three thresholds (the travel time difference, the travel time difference ratio, and the flow rate ratio difference) in automatically detecting the road incident 36 on the road segment 20 using the vehicle sensor data 12. The graph 300 illustrates the subsection 306 of the road segment 20 where the road incident 36 is detected by the incident detection component 26 using the travel time difference, the travel time difference ratio, and the flow rate ratio difference of the road segment 20.

Figure 4:
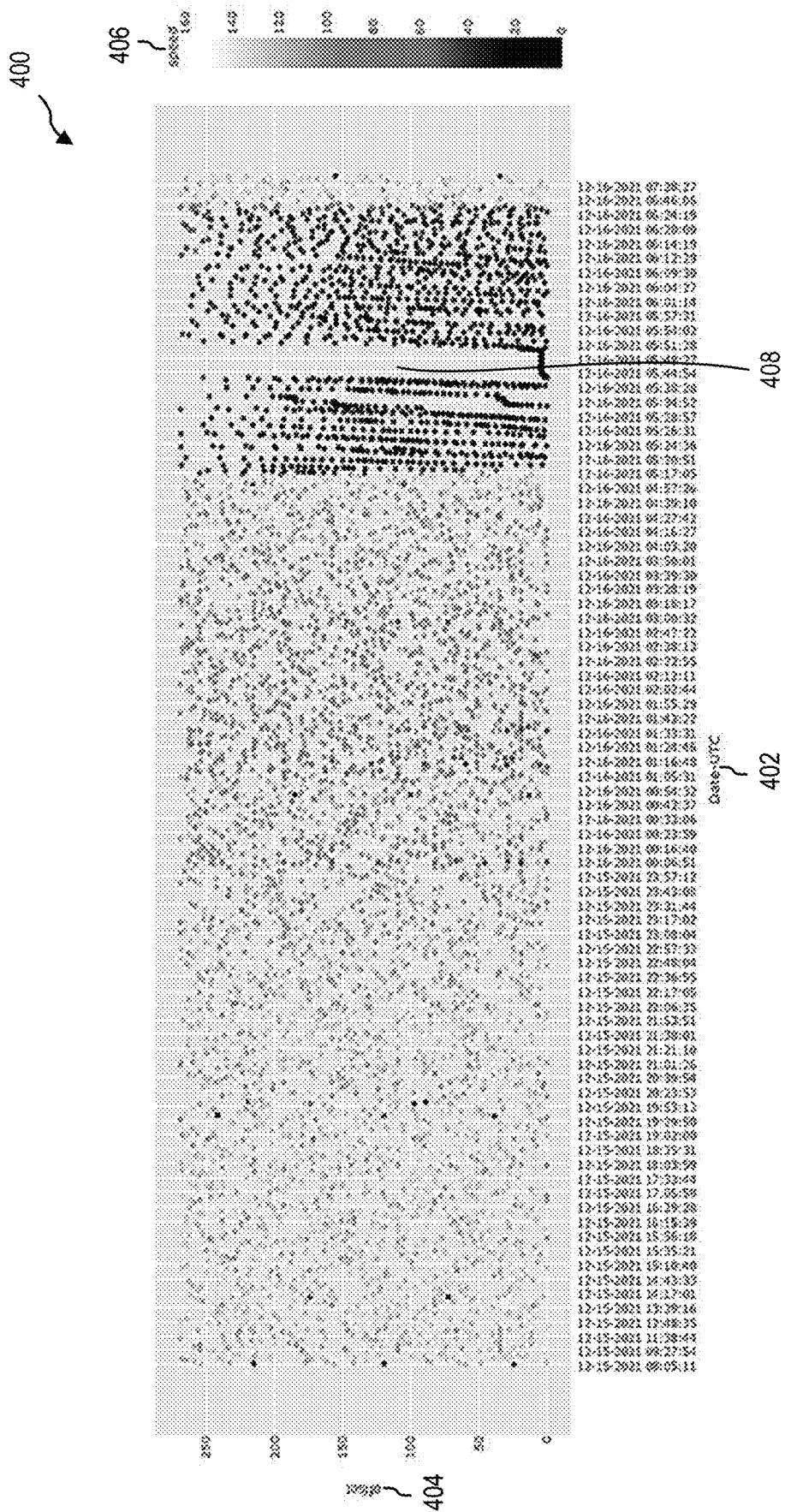
FIG. 4 illustrates an example time space diagram for a detected road incident on a road segment in accordance with implementations of the present disclosure.

Referring now to FIG. 4, illustrated is an example time space diagram 400 for a detected road incident 36 (FIG. 1) on a road segment 20 (FIG. 1) by the incident detection component 26 (FIG. 1). The time space diagram 400 illustrates the changes in speed of the vehicles 102 (FIG. 1) on the road segment 20 as identified by the vehicle sensor data 12 of the vehicles 102 in response to a road incident 36 occurring on the road segment 20. The time space diagram 400 includes an x-axis 402 with different time periods and a y-axis 404 with an offset in meters of the road segment 20. In the illustrated example, the road segment 20 is 300 meters. The legend 406 identifies the speed of the vehicles 102 in KPH on the road segment 20 during the time periods of the x-axis 402.

The area 408 identifies the road incident 36 impact on the speeds of the vehicles 102 on the road segment 20. Moreover, the area 408 identifies that the road incident 36 caused a blockage of the road segment 20 during the time frame since the vehicles 102 are not moving forward on the road segment 20 during the time frame associated with the area 408. Thus, the road incident 36 leads to increased travel time before the road incident 36 as compared to after the road incident 36. Moreover, the road incident 36 causes a reduction in the flow rate 30 (FIG. 1) of the vehicles on the road segment 20, as shown by the reduction in the offset of movement of the vehicles 102 along the road segment 20. The incident detection component 26 uses the reduction in the flow rate 30 and the change in the travel time along the road segment 20 as a trigger to identify that the road incident 36 occurred on the road segment 20. The incident detection component 26 also uses the increase in the flow rate 30 and the change in the travel time along the road segment 20 in confirming that the road incident 36 is no longer present on the road segment 20.

Figure 5:
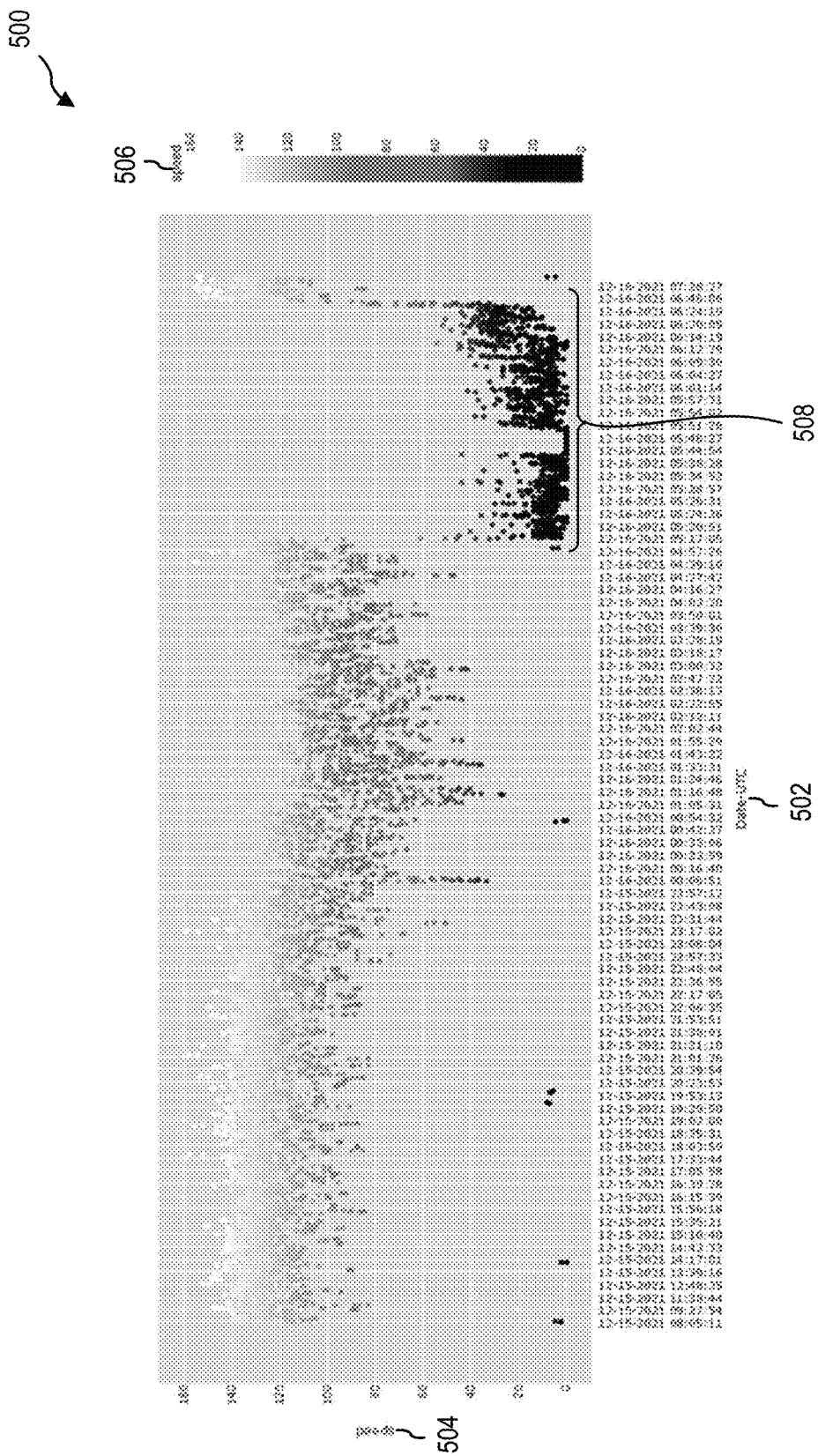
FIG. 5 illustrates an example speed diagram for a detected road incident on a road segment in accordance with implementations of the present disclosure.

Referring now to FIG. 5, illustrated is an example speed diagram 500 for a detected road incident 36 on a road segment 20. The speed diagram 500 illustrates the reduction in speed of the vehicles 102 on the road segment 20 in response to the road incident 36 occurring on the road segment 20. The speed diagram 500 includes an x-axis 502 with different time periods and a y-axis 504 with the different speeds in KPH. The legend 506 identifies the different speeds of the vehicles 102 in KPH. The section 508 illustrates the impact to the vehicle speeds in response to the detected road incident 36.

Figure 6:
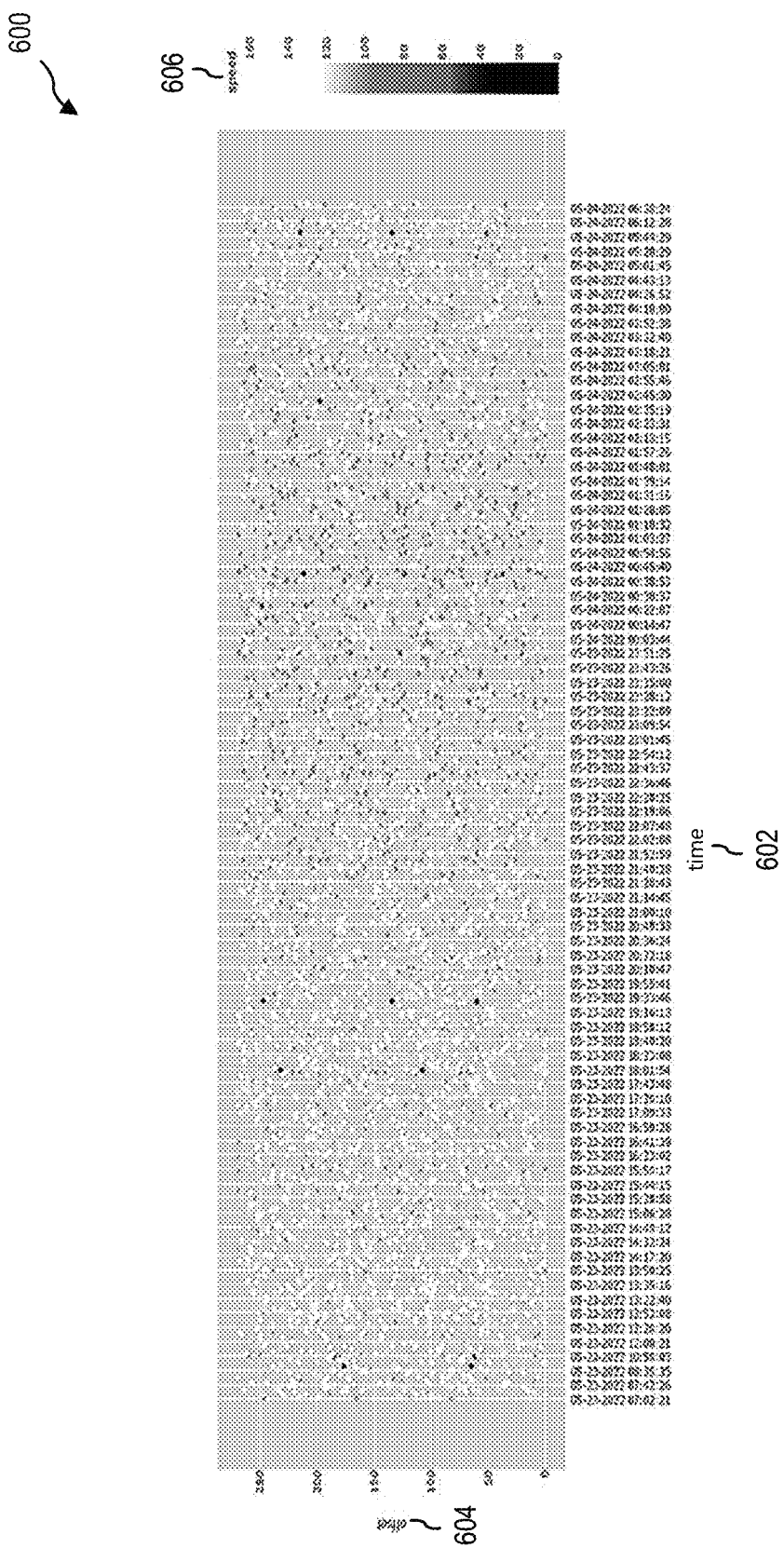
FIG. 6 illustrates an example time space diagram for a road segment without a road incident in accordance with implementations of the present disclosure.

Referring now to FIG. 6, illustrated is an example time space diagram 600 for a road segment 20 (FIG. 1) without a road incident 36 (FIG. 1). The time space diagram 600 includes an x-axis 602 with different time periods and a y-axis 604 with an offset in meters of the road segment 20. In the illustrated example, the road segment 20 is 300 meters. The legend 606 identifies the speed of the vehicles 102 in KPH on the road segment 20 during the time periods of the x-axis 602.

The time space diagram 600 illustrates the speed of the vehicles 102 (FIG. 1) on the road segment 20 as identified by the vehicle sensor data 12 of the vehicles 102. As illustrated, the vehicles 102 are moving at a high speed across the road segment 20 during the time periods. In addition, the time space diagram 600 does not show any gaps in the speed of the vehicles 102 along the road segment 20. The incident detection component 26 uses the information provided by the vehicle sensor data 12 (e.g., the vehicles 102 are moving at a high speed without any gaps in the road network) to determine that no road incidents 36 are detected on the road segment 20 and to determine the flow rate 30 for the road segment 20. The incident detection component 26 may generate a notification 38 with the flow rate 30 of the road segment 20 indicating that the flow rate 30 is near or at the posted speed of the road segment 20.

Figure 7:
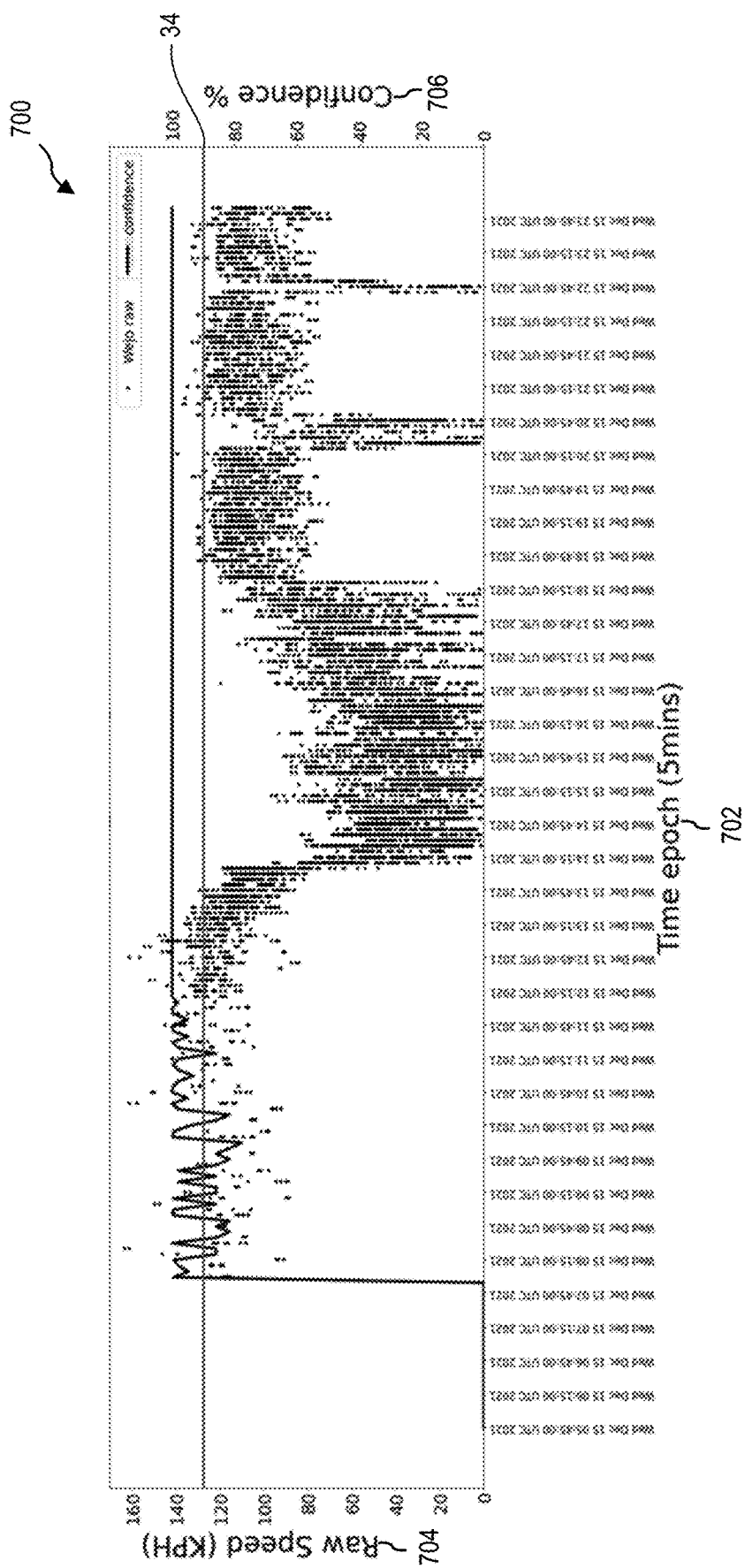
FIG. 7 illustrates an example graph with a confidence of the speed provided from a vehicle sensor in accordance with implementations of the present disclosure.

Referring now to FIG. 7, illustrated is an example graph 700 with a confidence 32 of the speed provided in the vehicle sensor data 12 from the vehicle sensor 10. The incident detection component 26 calculates the confidence 32 of the vehicle sensor data 12 using a variety of parameters of the vehicle sensor data 12 and/or the vehicle sensor 10. For example, the incident detection component 26 uses data freshness, a quality of the data providers, a number of vehicles reporting real time speeds, and/or a closeness of the speed values that are reported by the vehicles.

The graph 700 includes an x-axis with the time epoch 702 for receiving the vehicle sensor data 12 and calculating the confidence 32 of the vehicle sensor data 12. The graph 700 includes a y-axis with the speed 704 received in the vehicle sensor data 12 from the vehicle sensor 10 and a confidence percentage 706 of the vehicle sensor data 12. The confidence percentage 706 is the value output by the incident detection component 26 that identifies a level of trust of the vehicle sensor data 12 (a higher percentage value indicates a higher level of trust relative to a lower percentage value).

The graph 700 also illustrates a threshold 34 that the incident detection component 26 uses in determining whether to trust the vehicle sensor data 12 and use the vehicle sensor data 12. The incident detection component 26 uses the vehicle sensor data 12 for the confidence percentages that are equal to or exceed the threshold 34. For the confidence percentages that are below the threshold 34, the incident detection component 26 may not trust the information in the vehicle sensor data 12 and may use vehicle data 16 (FIG. 1) provided from an alternate source from the vehicle sensor 10.

Figure 8:
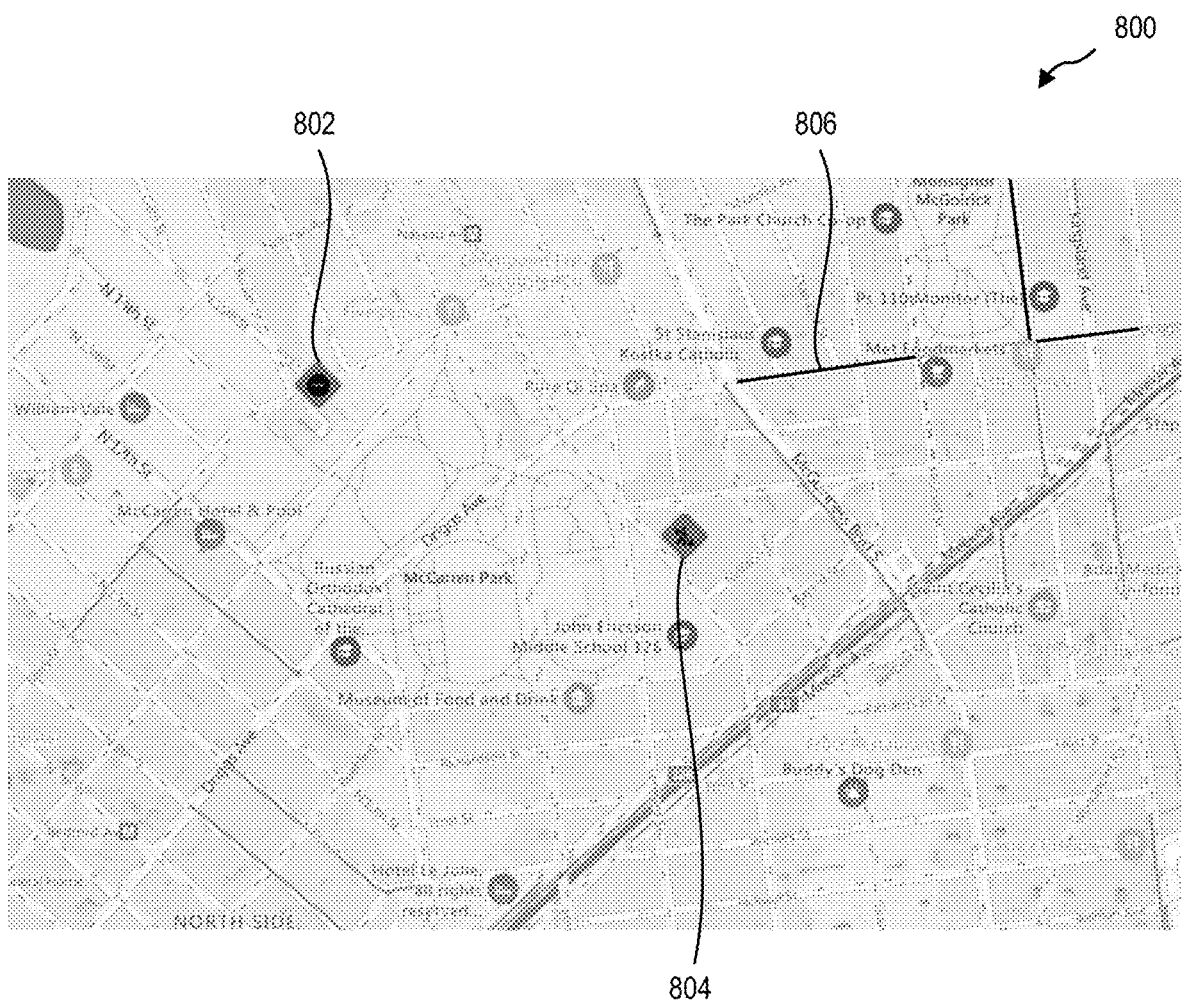
FIG. 8 illustrates an example graphical user interface of a map displaying road incidents in accordance with implementations of the present disclosure.

Referring now to FIG. 8, illustrated is an example graphical user interface of a map 42 presented on a display 110 (FIG. 1). The map 42 includes two icons 802, 804 at the location of the detected road incidents 36 (FIG. 1). The incident detection component 26 (FIG. 1) automatically detects the road incidents 36 using the vehicle sensor data 12 (FIG. 1) from the vehicles 102 (FIG. 1) currently on the road segments 20 of the map 42. The icon 802 indicates a road closure as the detected road incident 36 and the icon 804 indicates road construction as the detected road incident 36. The map 42 also includes a change in color 806 of the traffic flow 44 (FIG. 1) indicating that the traffic flow 44 is reduced. The incident detection component 26 detects the change in the flow rate 30 (FIG. 1) using the vehicle sensor data 12 from the vehicles 102 currently on the road segments 20 of the map 42.

Figure 9:
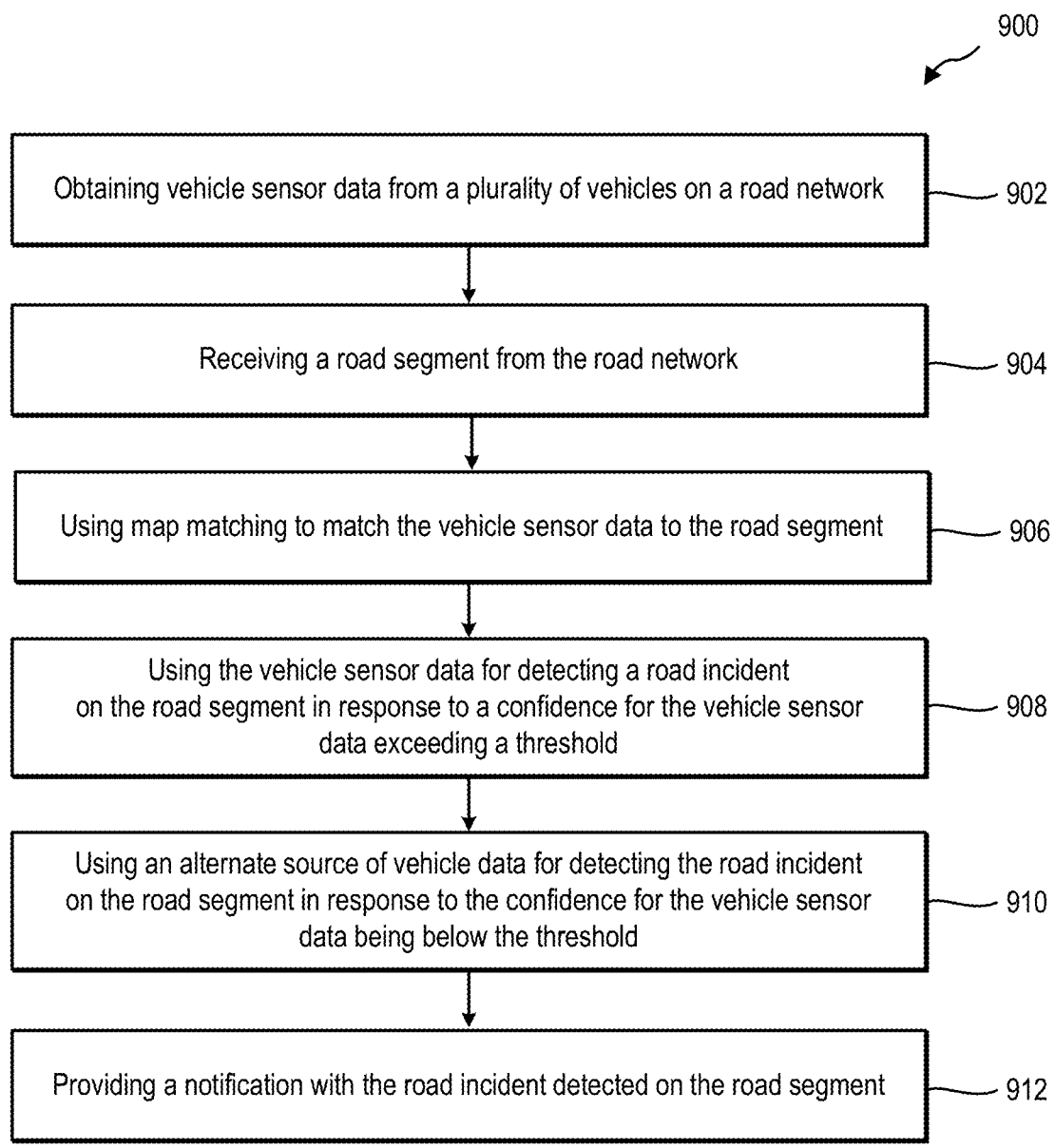
FIG. 9 illustrates an example method for detecting road incidents in accordance with implementations of the present disclosure.

Referring now to FIG. 9, illustrated is an example method 900 for detecting road incidents using vehicle sensor data. The actions of the method 900 are discussed below with reference to the architecture of FIGS. 1 and 2.

At 902, the method 900 includes obtaining vehicle sensor data from a plurality of vehicles on a road network. A traffic estimation component 106 obtains the vehicle sensor data 12 from a datastore 104. The vehicle sensor data 12 includes a speed of each vehicle 102, a timestamp of the vehicle sensor data 12, a location of each vehicle 102, and a heading of each vehicle 102. In some implementations, a data loader 14 obtains the vehicle sensor data 12 from the datastore 104.

In some implementations, a plurality of datastores 104 provide the vehicle sensor data 12 to the data loader 14. The datastores 104 may correspond to different content providers that obtain the vehicle sensor data 12 from different models of cars. For example, a first datastore 104 corresponds to a content provider that obtains vehicle sensor data 12 from a first car model. The second datastore 104 corresponds to a content provider that obtains vehicle sensor data 12 from a second car model and a third car model. The third datastore 104 corresponds to a content provider that obtains vehicle sensor data 12 from commercial vehicles. As such, the data loader 14 may obtain the vehicle sensor data 12 from a variety of content providers and/or different car models.

In some implementations, the data loader 14 obtains vehicle data 16 from an alternate source than the vehicle sensor data 12. The vehicle data 16 may include any data that is obtained using sources other than the vehicle sensor data 12 provided by the vehicles 102. The vehicle data 16 may include estimates of speed of the vehicle 102 or estimates of direction of travel of the vehicle 102. In some implementations, the alternate source is a third party and the vehicle data 16 may be obtained from a datastore 112 separate from the datastore 104.

At 904, the method 900 includes receiving a road segment from the road network. The traffic estimation component 106 uses the vehicle sensor data 12 to obtain the road segment 20 from a map datastore. A map matching component 18 is used to identify the road segment 20 of the vehicles 102 based on a distance and a heading of the vehicle from the vehicle sensor data 12. Given the set of road segments with the vehicle sensor data 12, the map matching component 18 filters the road segments 20 to process. For example, the map matching component 18 may identify highway road segments with the vehicle sensor data 12 to process first and identify arterials road segments with the vehicle sensor data 12 to process second.

At 906, the method 900 includes using map matching to match the vehicle sensor data to the road segment. The traffic estimation component 106 uses a map matching component 18 to perform a map matching process that aligns the vehicle sensor data 12 to the road segment 20. In some implementations, the map matching process identifies a segment start 202 of the road segment 20 and determines a plurality of points 210, 212, 214, 216, 218, 220 on the road segment 20. Each of the points 210, 212, 214, 216, 218, 220 includes an offset from the segment start 202. The map matching process determines a probability 22 that each vehicle 102 is on the road segment 20 at each point 210, 212, 214, 216, 218, 220 on the road segment 20. The map matching process uses the vehicle sensor data 12 to determine a timestamp 24 of each vehicle 102 at each point 210, 212, 214, 216, 218, 220 on the road segment 20. The map matching component 18 outputs the probability 22 and the timestamp 24.

At 908, the method 900 includes using the vehicle sensor data for detecting a road incident on the road segment in response to a confidence for the vehicle sensor data exceeding a threshold. The confidence 32 is a real number that provides a level of trust in the vehicle sensor data 12. The incident detection component 26 uses the vehicle sensor data 12 for detecting a road incident 36 on the road segment 20 in response to the confidence 32 for the vehicle sensor data 12 exceeding the threshold 34.

The incident detection component 26 uses the probability 22 that the vehicle 102 is on the road segment 20 and the timestamps 24 for the vehicle 102 on the road segment 20 in determining a vehicle speed estimation 28 of each vehicle 102 on the road segment 20. The incident detection component 26 divides the road segment 20 into a plurality of subsegments of equal length. The subsegment length is a configurable parameter. The incident detection component 26 determines a travel time of a vehicle 102 on two adjacent subsegments of the plurality of subsegments. The incident detection component 26 identifies a travel time difference between the two adjacent subsegments in response to determining a change in the vehicle speed estimation 28 of the vehicle between the two adjacent subsegments.

In some implementations, the incident detection component 26 identifies a travel time difference ratio between the two adjacent subsegments that identifies the change as a decrease in the vehicle speed estimation 28 of the vehicle 102 between the two adjacent subsegments. The incident detection component 26 determines a bottleneck exists at the two adjacent subsegments in response to the travel time difference ratio indicating a decrease in the vehicle speed estimation 28 of the vehicle 102 between the two adjacent subsegments.

The incident detection component 26 uses the vehicle sensor data 12 to determine a flow rate 30 of the plurality of vehicles 102 on the road segment 20. The flow rate 30 identifies a density of the vehicles 102 on the road segment 20 during a time period. The incident detection component 26 uses the vehicle sensor data 12 for each vehicle 102 on the road segment 20 during a first time period to determine the flow rate 30 for the road segment 20 during the first time period. The incident detection component 26 uses the vehicle sensor data 12 for each vehicle on the road segment 20 during a second time period to determine the flow rate 30 for the road segment during the second time period. The incident detection component 26 determines a flow rate ratio difference using the flow rate 30 at the first time period and the flow rate 30 at the second time period.

The incident detection component 26 uses a difference in the flow rate 30 between two consecutive time periods in identifying and/or confirming a road incident 36 on the road segment 20. The incident detection component 26 uses a change in the flow rate 30 (speed decreases) between two time periods in identifying the road incident 36 at the subsegment where the travel time decreases or identifying that the road incident 36 is no longer present on the road subsegment where the travel time is constant or returns back to normal. The incident detection component 26 uses three thresholds (the travel time difference between adjacent subsections of the road segment, the travel time difference ratio between adjacent subsections of the road segment, and the flow rate ratio difference over consecutive time periods) in automatically detecting the road incident 36 on the road segment 20 using the vehicle sensor data 12.

In some implementations, the incident detection component 26 calculates the confidence 32 by identifying a plurality of parameters for the vehicle sensor data 12. The plurality of parameters includes data freshness of the vehicle sensor data 12, a quality of a data provider for the vehicle sensor data 12, a number of vehicles reporting the vehicle sensor data 12, and a closeness of values being reported by the plurality of vehicles 102. The incident detection component 26 applies weights to each parameter of the plurality of parameters and calculates the confidence 32 using the weights and the plurality of parameters.

At 910, the method 900 includes using an alternate source of vehicle data for detecting the road incident on the road segment in response to the confidence for the vehicle sensor data being below the threshold. The incident detection component 26 uses the vehicle data 16 provided by the alternate source in detecting the road incident 36 in response to the confidence 32 for the vehicle sensor data 12 being below the threshold 34 (e.g., a lower level of trust exists for the vehicle sensor data 12). The alternate source of the vehicle data 16 is provided from a source different from the sensors 10 on the plurality of vehicles 102.

At 912, the method 900 includes providing a notification with the road incident detected on the road segment. The incident detection component 26 generates a notification 38 with the road incident 36 and road incident information. The road incident information includes a location (latitude and longitude coordinates) on the road subsegment 20 where the road incident 36 is detected, a direction of travel for the road incident 36, a timestamp 24 for the road incident 36, and the flow rate 30 for the road segment 20.

In some implementations, a map application 40 receives the notification 38 with the road incident 36 and the road incident information (e.g., the location of the road incident 36, the flow rate 30, and the timestamp 24). The map application 40 updates a map 42 of the road segment 20 with the detected road incident 36 (e.g., adds an icon or notification on the map 42 to identify the location of the road incident 36) and updates a traffic flow 44 displayed on the map based on the flow rate 30 of the road segment 20 in response to the road incident 36 occurring. The map application 40 changes a color displayed for the traffic flow 44 to indicated that the flow rate 30 of the road segment 20 has changed.

The method 900 provides automated detection of the road incidents 36 using the vehicle sensor data 12 to identify the road incidents 36 in response to a confidence 32 of the vehicle sensor data 12 being equal to a threshold 34 or exceeding the threshold 34 (e.g., a high level of trust exists in the vehicle sensor data 12 being provided by the sensors 10 on the vehicles 102). By automatically detecting the road incidents 36 using the vehicle sensor data 12, the method 900 detects the road incidents 36 in real time and provides earlier notifications of the road incidents 36.

Figure 10:
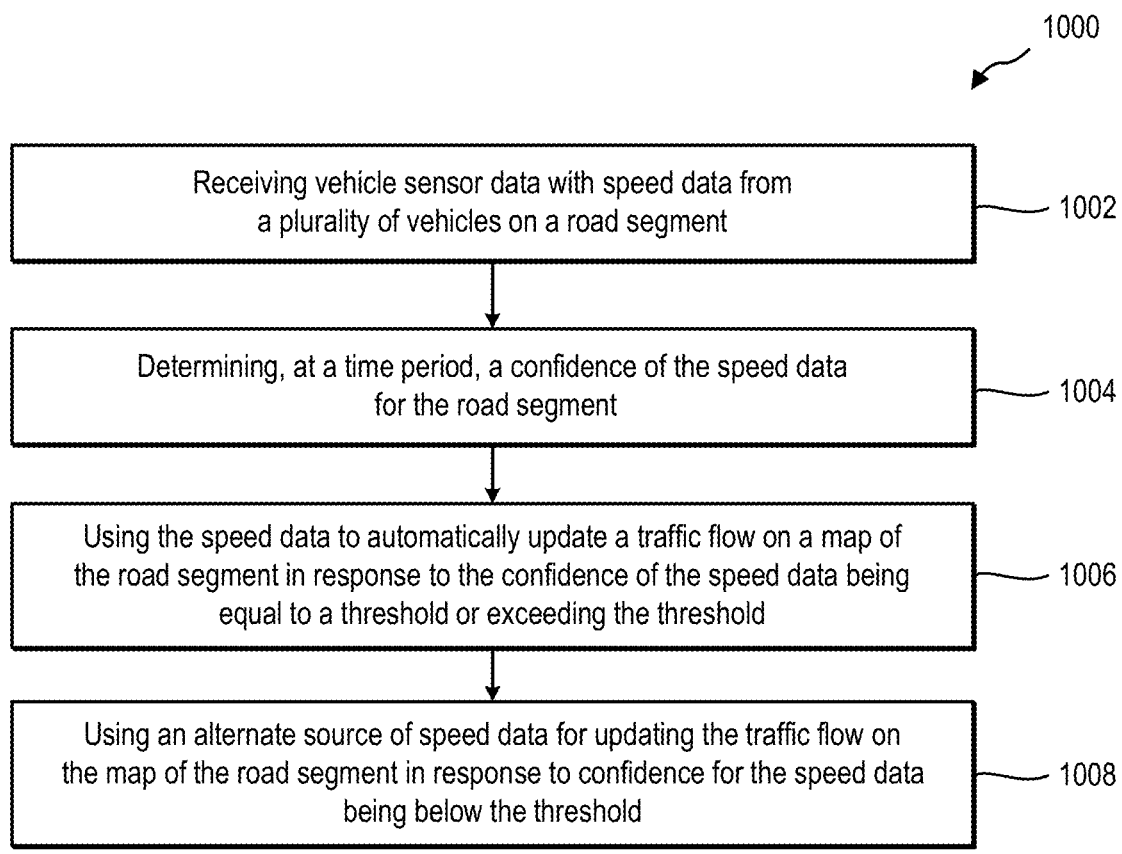
FIG. 10 illustrates an example method for determining a confidence value for vehicle sensor data in accordance with implementations of the present disclosure.

Referring now to FIG. 10, illustrated is an example method 1000 for determining a confidence value for the vehicle sensor data. The actions of the method 1000 are discussed below with reference to the architecture of FIG. 1.

At 1002, the method 1000 includes receiving vehicle sensor data with speed data from a plurality of vehicles on a road segment 20. The traffic estimation component 106 receives the vehicle sensor data 12 from a data loader 14 that periodically obtains the vehicle sensor data 12 from a plurality of vehicles 102 on the road segment 20. The road segment 20 represents a section of the road with certain attributes, such as, speed limit, lanes, etc. For example, the road segment 20 may be defined by the standard traffic message channel (TMC) convention. The vehicle sensor data 12 is mapped to the road segment 20 using the map matching component 18.

At 1004, the method 1000 includes determining, at a time period, a confidence of the speed data for the road segment. The incident detection component 26 determines the confidence 32 of the vehicle sensor data 12 provided by the sensors 10 of the vehicles 102 on the road segment 20 at each time period. For example, if the time period is ten minutes, the incident detection component 26 determines the confidence of the vehicle sensor data 12 every ten minutes (e.g., at 1:00 pm, at 1:10 pm, at 1:20 pm, etc.) for the road segment 20. The incident detection component 26 uses a plurality of parameters and associated weights for the parameters in determining the confidence 32 of the vehicle sensor data 12.

The incident detection component 26 identifies a plurality of parameters for the vehicle sensor data 12. One example parameter is data freshness of the vehicle sensor data 12 provided by the vehicle 102. Another example parameter is quality of the data providers providing the vehicle sensor data 12. For example, a quality score is provided for a sensor data provider for the vehicle sensor data 12. Another example parameter is a quality of a vehicle type providing the vehicle sensor data 12. Another example parameter is a number of the vehicles 102 reporting the vehicle sensor data 12. Another example parameter is a closeness in values being reported in the vehicle sensor data 12. Any type of parameter may be identified by the incident detection component 26 to use in identifying a level of trust in the vehicle sensor data 12. Moreover, the incident detection component 26 may use any combination of parameters in determining a level of trust in the vehicle sensor data 12.

The incident detection component 26 applies weights to the plurality of parameters. In some implementations, different weights are applied to different parameters. For example, data freshness has a higher weight relative to a quality of the device. Another example includes multiple vehicles reporting the vehicle sensor data 12 has a different weight relative to a weight for a closeness of the values that are reported by the vehicles 102.

In some implementations, the incident detection component 26 determines the confidence 32 of the reported speed (the speed data) in the vehicle sensor data 12 of the plurality of vehicles 102 on the road segment 20. For example, the incident detection component 26 may apply a higher weight to recent speed reported from the vehicles 102 on the road segment 20 as compared to the speed reported the previous week on the road segment 20. Another example includes the incident detection component 26 applying different weights to different data providers. For example, commercial drivers may tend to drive slower on the road segment 20, which may not reflect the actual speed of travel on the road segment 20, and the incident detection component 26 applies a lower weight to the speed reported from the commercial data providers while applying a higher weight to the speed reported from non-commercial data providers. Another example includes the incident detection component 26 applying a higher weight to the speed reported when more vehicles 102 report the speed relative to less vehicles 102 reporting the speed. Another example includes the incident detection component 26 applying a higher weight to a closeness in speed values when a plurality of vehicles 102 report speed values that are close to each other without wide variances in the speed.

One example use case includes the reported speed values in the vehicle sensor data 12 for a road segment 20 having a high variance of speed values (e.g., a portion of the vehicles 102 on the road segment 20 are reporting low speed and a portion of the vehicles 102 on the road segment 20 are reporting high speed) for the time period. Another example use case includes the reported speed values in the vehicle sensor data 12 for the road segment 20 having a mix of values for the speed values (e.g., a portion of the vehicles 102 on the road segment 20 are reporting high speeds, a portion of the vehicles 102 on the road segment 20 are reporting no speed, and a portion of the vehicles 102 on the road segment 20 are reporting low speed) for the time period. Another example use case includes the reported speed values in the vehicle sensor data 12 for the road segment 20 having consistent speed (e.g., majority of the vehicles 102 are reporting fast speeds or a majority of the vehicles 102 are reporting low speed). Having variances in the speed reported may make it difficult to determine the speed for the road segment 20 using the vehicle sensor data 12. The confidence 32 of the reported speed is used to identify a level of trust in the estimated speed for the road segment 20. The incident detection component 26 calculates the confidence 32 for the vehicle sensor data 12 to provide a level of trust in the estimated speed for the road segment 20 based on the reported speed values in the vehicle sensor data 12.

At 1006, the method 1000 includes using the speed data to automatically update a traffic flow on a map of the road segment in response to the confidence of the speed data being equal to a threshold or exceeding the threshold. The confidence 32 is a value (a real number) that indicates a level of trust in the vehicle sensor data 12. The incident detection component 26 generates a notification 38 with the flow rate 30 for the road segment 20 determined using the speed data provided in the vehicle sensor data 12 in response to the confidence 32 being equal to the threshold 34 or exceeding the threshold 34.

A map application 40 receives the notification 38 with the flow rate 30 for the road segment 20 and automatically updates a traffic flow 44 on the map 42 in response to receiving the notification 38. For example, a color of the traffic flow 44 displayed on the map 42 is changed (e.g., from green to orange or red to green) to indicate a change in a density of traffic for the road segment 20. As such, the traffic flow 44 is automatically updated on the map 42 using the speed data provided in the vehicle sensor data 12 in response to the confidence 32 of the speed data exceeding the threshold 34.

At 1008, the method 1000 includes using an alternate source of speed data for updating the traffic flow on the map of the road segment in response to the confidence of the speed data being below the threshold. The incident detection component 26 generates a notification 38 with the flow rate 30 for the road segment 20 determined using an alternate source of speed data for the road segment 20 in response to the confidence 32 being below the threshold 34. In some implementations, the threshold 34 is a confidence value associated with the alternate source of speed data. In some implementations, the alternate source of speed data is a third-party data provider that provides an estimate of speed data for the road segment 20.

The map application 40 receives the notification 38 with the flow rate 30 for the road segment 20 and automatically updates a traffic flow 44 on the map 42 in response to receiving the notification 38. For example, a color of the traffic flow 44 displayed on the map 42 is changed (e.g., from yellow to red or orange to green) to indicate a change in a density of traffic for the road segment 20. As such, the traffic flow 44 is updated on the map 42 using the speed data provided from an alternate source for the speed data instead of the vehicle sensor data 12 in response to the confidence 32 of the speed data being below the threshold 34.

The method 1000 automatically updates the traffic flow of a road segment 20 on the map 42 in real time using the speed data provided in the vehicle sensor data 12. By updating the traffic flow on the map in real time based on the vehicle sensor data, the maps 42 are provided with updated traffic information for the road segment 20 that reflects the current traffic flow 44 on the map 42.

Figure 11:
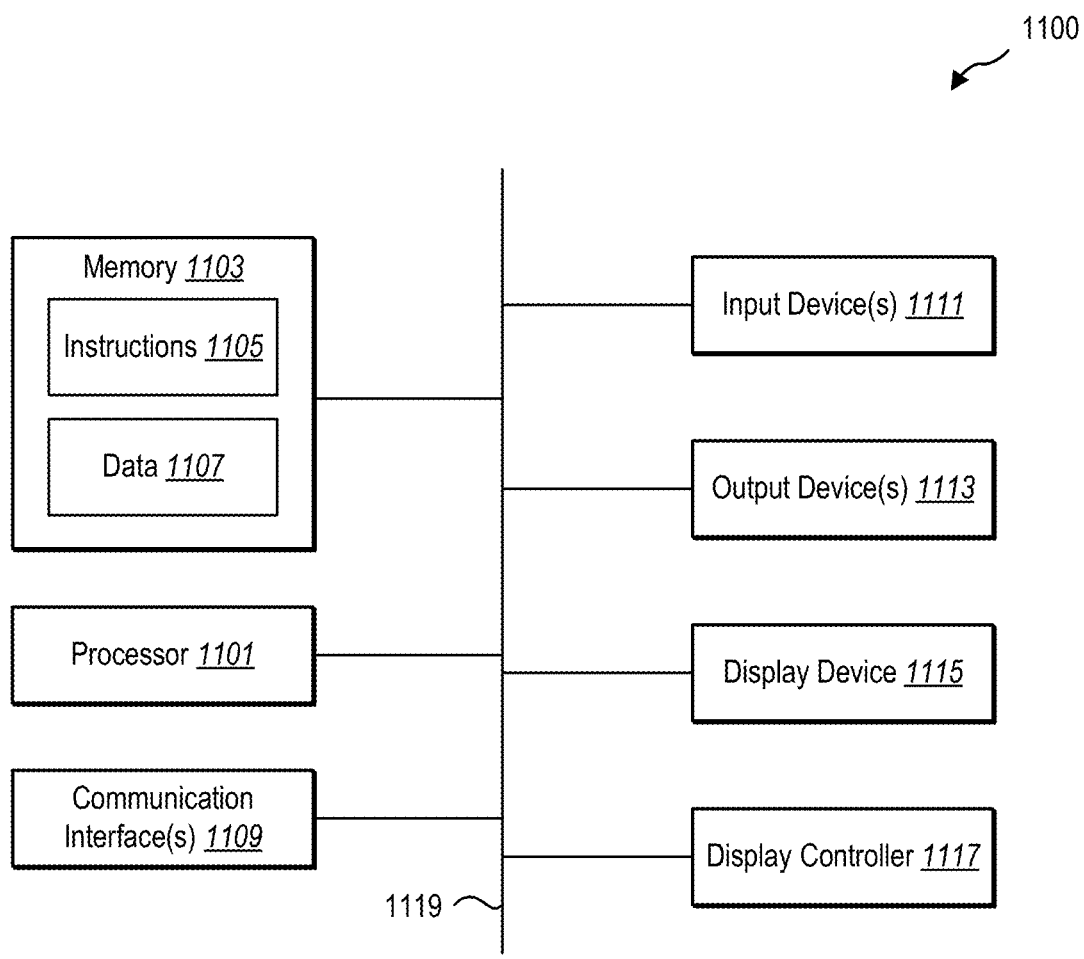
FIG. 11 illustrates components that may be included within a computer system.

FIG. 11 illustrates components that may be included within a computer system 1100. One or more computer systems 1100 may be used to implement the various methods, devices, components, and/or systems described herein.

The computer system 1100 includes a processor 1101. The processor 1101 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1101 may be referred to as a central processing unit (CPU). Although just a single processor 1101 is shown in the computer system 1100 of FIG. 11, in an alternative configuration, a combination of processors (e.g., an ARM and DSP) could be used.

The computer system 1100 also includes memory 1103 in electronic communication with the processor 1101. The memory 1103 may be any electronic component capable of storing electronic information. For example, the memory 1103 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 1105 and data 1107 may be stored in the memory 1103. The instructions 1105 may be executable by the processor 1101 to implement some or all of the functionality disclosed herein. Executing the instructions 1105 may involve the use of the data 1107 that is stored in the memory 1103. Any of the various examples of modules and components described herein may be implemented, partially or wholly, as instructions 1105 stored in memory 1103 and executed by the processor 1101. Any of the various examples of data described herein may be among the data 1107 that is stored in memory 1103 and used during execution of the instructions 1105 by the processor 1101.

A computer system 1100 may also include one or more communication interfaces 1109 for communicating with other electronic devices. The communication interface(s) 1109 may be based on wired communication technology, wireless communication technology, or both. Some examples of communication interfaces 1109 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1100 may also include one or more input devices 1111 and one or more output devices 1113. Some examples of input devices 1111 include a keyboard, mouse, microphone, remote control device, button, joystick, trackball, touchpad, and lightpen. Some examples of output devices 1113 include a speaker and a printer. One specific type of output device that is typically included in a computer system 1100 is a display device 1115. Display devices 1115 used with embodiments disclosed herein may utilize any suitable image projection technology, such as liquid crystal display (LCD), light-emitting diode (LED), gas plasma, electroluminescence, or the like. A display controller 1117 may also be provided, for converting data 1107 stored in the memory 1103 into text, graphics, and/or moving images (as appropriate) shown on the display device 1115.

The various components of the computer system 1100 may be coupled together by one or more buses, which may include a power bus, a control signal bus, a status signal bus, a data bus, etc. For the sake of clarity, the various buses are illustrated in FIG. 11 as a bus system 1119.

In some implementations, the various components of the computer system 1100 are implemented as one device. For example, the various components of the computer system 1100 are implemented in a mobile phone or tablet. Another example includes the various components of the computer system 1100 implemented in a personal computer.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   obtaining from sensors on a plurality of vehicles, vehicle sensor data from the plurality of vehicles traveling on a road network;
   receiving a road segment from the road network;
   matching, using a map matching process, the vehicle sensor data to the road segment;
   dividing the road segment into a plurality of subsegments;
   determining, using the vehicle sensor data as a vehicle travels on the road network, a travel time of the vehicle on two adjacent subsegments of the plurality of subsegments, wherein the two adjacent subsegments includes an upstream subsegment and a downstream subsegment;
   identifying a travel time difference between the two adjacent subsegments in response to determining a change in vehicle speed of the vehicle between the two adjacent subsegments, wherein a reduction in speed of the vehicle is detected in response to the travel time of the upstream subsegment is greater than the travel time of the downstream subsegment;
   determining, using the travel time, a flow rate that identifies a number of vehicles on the road segment during a time period;
   using the vehicle sensor data, the travel time difference, and the flow rate for detecting a road incident on the road segment in response to a confidence for the vehicle sensor data exceeding a threshold;
   providing a notification with a location on the road segment where the road incident is detected and a flow rate of the road segment; and
   using an alternate source of vehicle data for detecting the road incident on the road segment in response to the confidence for the vehicle sensor data being below the threshold.

2. The method of claim 1, wherein the alternate source of the vehicle data is provided from a source different from vehicle sensors on the plurality of vehicles.

3. The method of claim 1, wherein the vehicle sensor data includes a speed of each vehicle, a timestamp of the vehicle sensor data, a location of each vehicle, and a heading of each vehicle.

4. The method of claim 1, wherein the map matching further comprises:
   identifying a segment start of the road segment;
   determining a plurality of points on the road segment, where each point of the plurality of points includes an offset from the segment start of the road segment; and
   determining a probability that each vehicle is on the road segment at each point of the plurality of points on the road segment.

5. The method of claim 4, wherein the map matching uses the vehicle sensor data to determine a timestamp of each vehicle at each point of the plurality of points on the road segment and outputs the probability and the timestamp.

6. The method of claim 1, wherein the confidence is a real number that provides a level of trust in the vehicle sensor data.

7. The method of claim 1, wherein the confidence is determined by:
   identifying a plurality of parameters for the vehicle sensor data;
   applying weights to each parameter of the plurality of parameters; and
   calculating the confidence using the weights and the plurality of parameters.

8. The method of claim 7, wherein the plurality of parameters include data freshness of the vehicle sensor data, a quality score of a sensor data provider for the vehicle sensor data, a number of vehicles reporting the vehicle sensor data, and a closeness of values being reported by the plurality of vehicles.

9. The method of claim 1, further comprising:
identifying a travel time difference ratio between the two adjacent subsegments that identifies the change as a decrease in the vehicle speed estimation of the vehicle between the two adjacent subsegments; and
determining a bottleneck exists at the two adjacent subsegments in response to the travel time difference ratio.

10. The method of claim 9, further comprising:
determining a flow rate of the plurality of vehicles using the vehicle sensor data for the road segment at a first time period;
determining the flow rate of the plurality of vehicles using the vehicle sensor data for the road segment at a second time period; and
determining a flow rate ratio difference using the flow rate at the first time period and the flow rate at the second time period.

11. The method of claim 10, further comprising:
using the flow rate ratio, the travel time difference ratio, and the travel time difference to detect a location of the road incident on the road segment and a timestamp for the road incident.

12. The method of claim 1,
wherein the notification provides a user an early warning of the road incident.

13. A device, comprising:
a processor;
memory in electronic communication with the processor; and
instructions stored in the memory, the instructions being executable by the processor to:
receive, from sensors on a plurality of vehicles, vehicle sensor data with speed data from the plurality of vehicles traveling on a road segment;
divide the road segment into a plurality of subsegments;
determine, using the vehicle sensor data as a vehicle travels on the road network, a travel time of the vehicle on two adjacent subsegments of the plurality of subsegments, wherein the two adjacent subsegments includes an upstream subsegment and a downstream subsegment;
identify a travel time difference between the two adjacent subsegments in response to determining a change in vehicle speed of the vehicle between the two adjacent subsegments, wherein a reduction in speed of the vehicle is detected in response to the travel time of the upstream subsegment is greater than the travel time of the downstream subsegment;
determine, using the travel time, a flow rate that identifies a number of vehicles on the road segment;
determine, at a time period, a confidence of the speed data for the road segment using the travel time and the flow rate;
use the speed data to automatically update a traffic flow on a map of the road segment in response to the confidence of the speed data being equal to a threshold or exceeding the threshold; and
use an alternate source of the speed data for updating the traffic flow on the map of the road segment in response to the confidence for the speed data being below the threshold.

14. The device of claim 13, wherein the instructions are further executable by the processor to determine the confidence by:
identifying a plurality of parameters for the vehicle sensor data;
assigning weights to each parameter of the plurality of parameters; and
calculating the confidence using the weights and the plurality of parameters.

15. The device of claim 14, wherein the plurality of parameters include data freshness of the vehicle sensor data, a quality of a data provider for the vehicle sensor data, a number of vehicles reporting the vehicle sensor data, and a closeness of values being reported by the plurality of vehicles.

16. The device of claim 13, wherein the confidence is a real number that provides a level of trust in the speed data.

17. The device of claim 13, wherein the alternate source of the speed data is provided from a source different from sensor on the plurality of vehicles.

18. The device of claim 13, wherein the threshold is a confidence level of the alternate source of the speed data.

19. The device of claim 13, wherein the instructions are further executable by the processor to update the traffic flow by changing a color displayed on the map of the road segment.

* * * * *